United States Patent [19]
Reeds

[11] Patent Number: 5,255,711
[45] Date of Patent: Oct. 26, 1993

[54] SPRING-LOADED PRESSURE REGULATING VALVE INCLUDING ROLLING DIAPHRAGM AND COMPENSATION FOR VARIATION OF SPRING FORCE WITH DIAPHRAGM DISPLACEMENT

[75] Inventor: John W. Reeds, Thousand Oaks, Calif.

[73] Assignee: Hughes Aircraft Company, Los Angles, Calif.

[21] Appl. No.: 936,974

[22] Filed: Aug. 28, 1992

[51] Int. Cl.$^5$ ............................................. G05D 16/02
[52] U.S. Cl. ............................... 137/505.41; 92/98 D; 251/75
[58] Field of Search ...................... 137/505.41; 251/75; 92/98 D

[56] References Cited
U.S. PATENT DOCUMENTS

| | | | |
|---|---|---|---|
| 2,031,174 | 2/1936 | Mills | 251/75 X |
| 2,574,700 | 11/1951 | Knauss | 92/98 D X |
| 2,950,739 | 8/1960 | Lofink | 92/98 D X |
| 2,960,107 | 11/1960 | Falconer | 137/505.41 X |
| 3,375,759 | 4/1968 | Smith | 92/98 D |
| 3,731,707 | 7/1970 | Berle et al. | 251/75 X |
| 4,026,314 | 5/1977 | Turner et al. | 251/75 X |
| 4,067,376 | 1/1978 | Barabino . | |
| 4,098,285 | 7/1978 | Karing | 137/117 |
| 4,742,857 | 5/1988 | Gandhi . | |
| 4,938,272 | 7/1990 | Sandy, Jr. et al. . | |

OTHER PUBLICATIONS

Epic Technologies, Inc. brochure, "Technical Description Epic Low Tire Warning System", published at least as early as Jul., 1990.

Primary Examiner—Stephen M. Hepperle
Attorney, Agent, or Firm—V. D. Duraiswamy; W. K. Denson-Low

[57] ABSTRACT

A chamber (24) is filled with a fluid whose pressure is to be regulated to a predetermined value. A valve (30) is disposed between the chamber (24) and a high pressure source of the fluid. A rolling diaphragm (18) has a face (18c) exposed to the fluid in the chamber (24), and actuates the valve (30) to connect the chamber (24) to the source when the chamber pressure drops below the predetermined value and to disconnect the chamber (24) from the source when the chamber pressure rises to substantially the predetermined value. A spring (26) urges the diaphragm (18) against the chamber pressure with a force corresponding to the predetermined pressure value. A piston (14) is connected between the spring (26) and the diaphragm (18) and is formed with a ramp portion (14b) over which a rolling portion (18b) of the diaphragm (18) extends and varies the effective diameter of the diaphragm (18) as a predetermined function of the longitudinal position of the diaphragm such that the force exerted on the diaphragm (18) by the chamber pressure is maintained substantially equal to the force exerted on the diaphragm (18) by the spring (26). This compensates for variation of the spring force as the fluid flow rate through the valve (30) and thereby the position of the diaphragm (18) change and maintains the regulated pressure constant. A bistable element (42) may be provided to urge the diaphragm (18) toward first and second longitudinal positions in which the valve (30) is open and closed respectively.

4 Claims, 5 Drawing Sheets

SPRING-LOADED PRESSURE REGULATING VALVE INCLUDING ROLLING DIAPHRAGM AND COMPENSATION FOR VARIATION OF SPRING FORCE WITH DIAPHRAGM DISPLACEMENT

BACKGROUND OF THE INVENTION

1. Field of the Invention

The present invention generally relates to the control and regulation of fluid pressure, and more specifically to a spring-loaded pressure regulating valve including a rolling diaphragm and compensation for variation of the spring force with diaphragm displacement.

2. Description of the Related Art

It is required in many applications to regulate the pressure of a fluid such as air in a chamber or conduit to a predetermined value. For example, a high pressure air reservoir may be provided in a wheel on which a tire for an automotive vehicle is mounted, and a pressure regulating valve disposed between the reservoir and the tire. When the tire pressure drops below a predetermined value, the valve opens and allows air from the reservoir to flow into the tire. When the tire pressure has risen to the predetermined value, the valve closes and stops the supply of air from the reservoir. A typical system of this type is disclosed in U.S. Pat. No. 4,967,376, entitled "TIRE PRESSURE WARNING SYSTEM", issued Jan. 10, 1978 to W. Barabino.

A conventional pressure regulating valve such as disclosed in the Barabino patent includes a control element in the form of a piston, diaphragm or bellows which has one end exposed to the chamber pressure which is to be regulated. A compression spring engages with the opposite end of the control element and urges it against the chamber pressure with a force corresponding to the predetermined pressure value. The control element actuates a valve which is connected between the high pressure reservoir and the chamber. As the chamber pressure drops below the predetermined value, the spring moves the valve element to an open position which establishes communication between the reservoir and the chamber, and vice-versa.

A conventional spring-loaded pressure regulating valve is disadvantageous in that the regulated pressure decreases as the fluid flow rate increases. More specifically, the valve must be opened to a greater extent to enable an increase in flow rate. This causes the compression spring to expand and exert a smaller force on the control element in accordance with Hooke's Law, $F = KX$, where F is the spring force, X is the spring compression (displacement of one end of the spring relative to the opposite end) and K is the "spring constant" which corresponds to the stiffness of the spring.

The force exerted on the control element by the fluid pressure in the chamber is equal to $F = PA$, where P is the chamber pressure and A is the cross-sectional area of the control element exposed to the pressure P in opposition to the spring force. Combining these equations produces $P = KX/A$. Since K and A are constant, the pressure P to which the air in the chamber is regulated is proportional to the spring compression X, and decreases as the valve opens and the spring expands. Thus, a conventional pressure regulating valve disadvantageously regulates the chamber pressure to a progressively lower value as the fluid flow rate increases and the valve opens to a larger extent.

SUMMARY OF THE INVENTION

The present invention provides a spring-loaded fluid pressure control mechanism, and a pressure regulating valve incorporating the control mechanism, which compensates for the decrease in spring force as the fluid flow rate increases and regulates the fluid pressure to a substantially constant value at all values of flow rate. The present invention is especially suitable for use in a tire pressure regulation system for an automotive vehicle, but is not so limited, and can be advantageously utilized in any application in which precise regulation of air or other fluid pressure is required.

In accordance with the present invention, a chamber is filled with a fluid whose pressure is to be regulated to a predetermined value. A valve is disposed between the chamber and a high pressure source of the fluid.

A rolling diaphragm has a face exposed to the fluid in the chamber, and actuates the valve to connect the chamber to the source when the chamber pressure drops below the predetermined value and to disconnect the chamber from the source when the chamber pressure rises to substantially the predetermined value.

A spring urges the diaphragm against the chamber pressure with a force corresponding to the predetermined pressure value. A piston is connected between the spring and the diaphragm and is formed with a shaped, preferably ramp portion over which a rolling portion of the diaphragm extends and varies the effective diameter of the diaphragm as a predetermined function of the longitudinal position thereof, such that the force exerted on the diaphragm by the chamber pressure is maintained substantially equal (or in some other desired relationship) to the force exerted on the diaphragm by the spring.

This compensates for variation of the spring force as the fluid flow rate through the valve and thereby the position of the diaphragm change and maintains the regulated pressure constant.

A bistable element may be provided to urge the diaphragm toward first and second longitudinal positions in which the valve is open and closed respectively.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
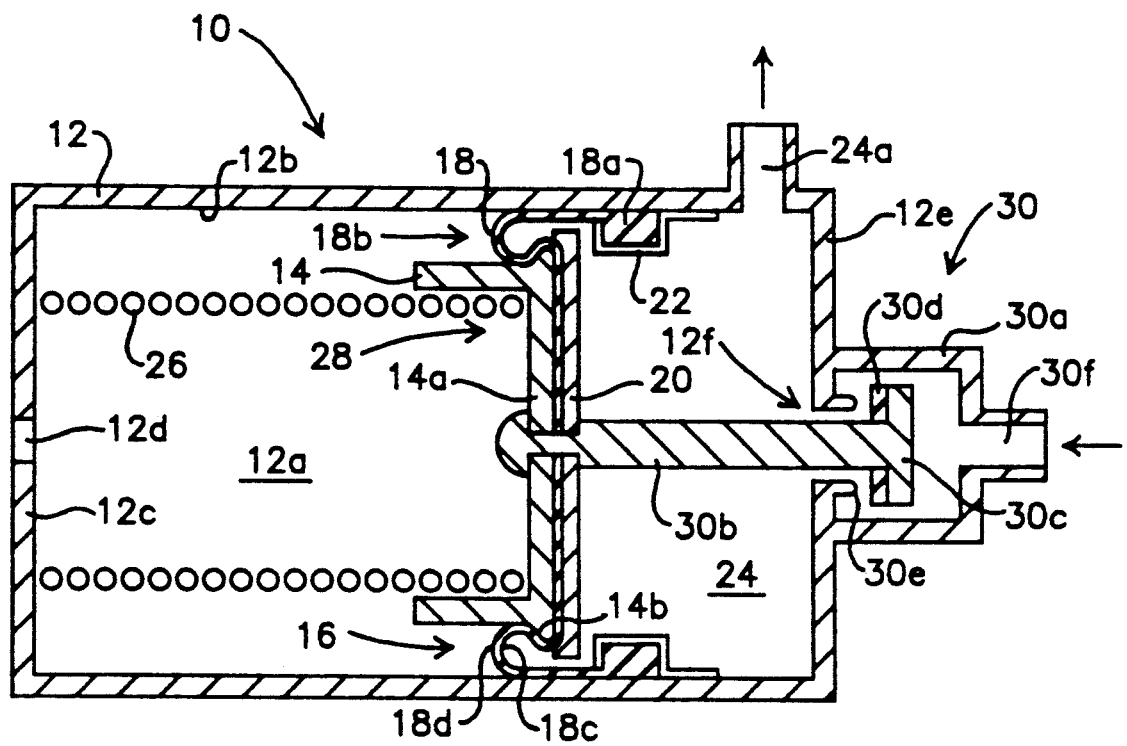
FIG. 1 is a longitudinal sectional view illustrating a first embodiment of a pressure regulating valve according to the present invention in an open position.

As illustrated in FIG. 1, a pressure regulating valve embodying the present invention is generally designated as 10, and includes a cylinder 12 having a bore 12a with an inner peripheral surface 12b. The cylinder 12 further has a left (as viewed in the drawing) end wall 12c, with a hole 12d formed therethrough to vent the left portion of the bore 12a to atmospheric pressure.

A piston 14 is disposed in the bore 12a for longitudinally movement, and is smaller than the inner diameter of the bore 12a such that an annular space 16 is defined between the piston 14 and the inner peripheral surface 12b of the cylinder 12. The piston 14 has a right end wall 14a. The radially inner portion of a rolling diaphragm 18 is fixed to the wall 14a of the piston 14 by a cap 20. The diaphragm 18 has a bead 18a at its radially outer periphery which is sealingly fixed to the surface 12b by an annular clamp 22. A folded or "rolling" portion 18b of the diaphragm 18 extends into the annular space 16. The diaphragm 18 per se is commercially available, for example, from the Bellofram company of Newell, W. Va.

The cylinder 12 further has a right end wall 12e which defines, in combination with the inner peripheral surface 12b and diaphragm 18, a pressure chamber 24. The chamber 24 is filled with a fluid such as air whose pressure is to be regulated, and has an outlet 24a which may, for example, communicate with the interior of a automotive tire (not shown).

The fluid pressure in the chamber 24 urges the diaphragm 18 and piston 14 leftwardly. A compression spring 26 is disposed in a pre-loaded state between the wall 12c of the cylinder 12 and the wall 14a of the piston 14, and urges the piston 14 and thereby the diaphragm 18 rightwardly against the chamber pressure.

The elements described above constitute a control mechanism 28 which functions to regulate the pressure in the chamber 24 and thereby in an automotive tire or the like which communicates with the chamber 24 through the outlet 24a. To achieve this goal, the mechanism 28 is connected to actuate a valve unit 30.

More specifically, the valve unit 30 includes a valve housing 30a which extends rightwardly from the wall 12e of the cylinder 12 and communicates with the chamber 24 through a hole 12f in the wall 12e. A valve element 30b extends from the piston 14 through the hole 12f and has a flange 30c at its right end. A resilient seal member 30d is fixed to the left surface of the flange 30c, and is sealingly engagable with a valve seat 30e which extends from the wall 12e around the valve element 30b in conjugate relation to the seal member 30d.

Figure 2:
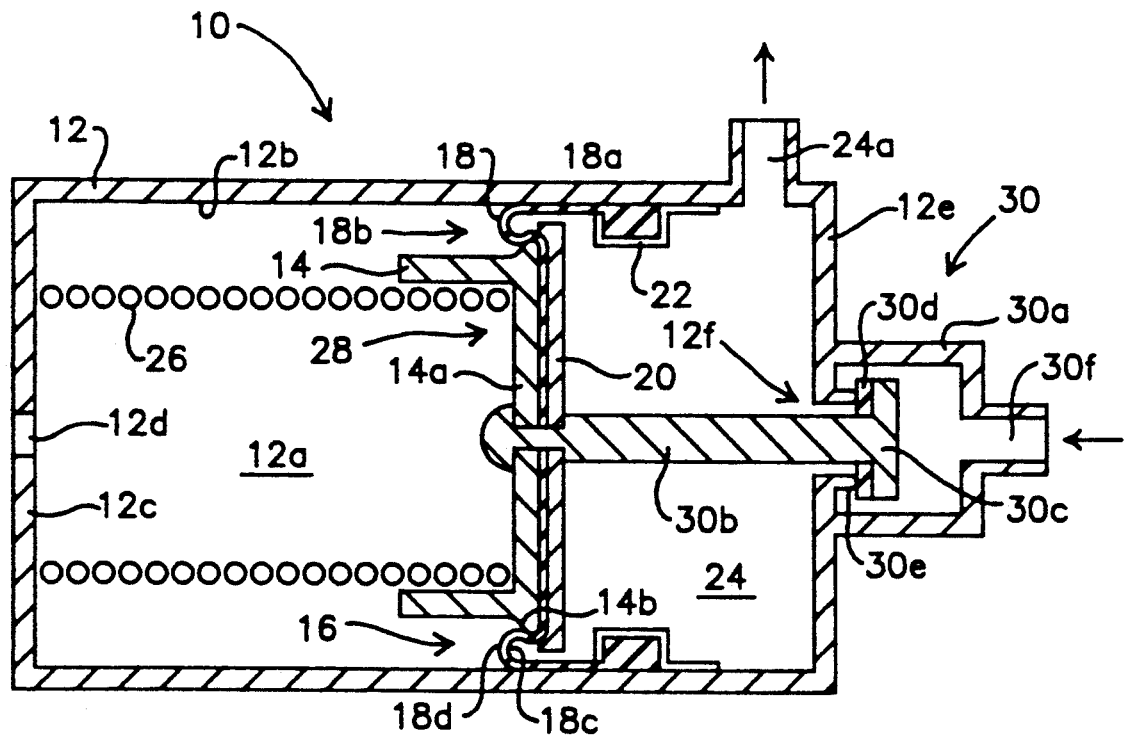
FIG. 2 is similar to FIG. 1, but illustrates the valve in a closed position.

The valve unit 30 further has an inlet 30f which communicates the interior of the housing 30a with a source (not shown) of high pressure fluid such as a high pressure air reservoir in a wheel of an automotive vehicle. As viewed in FIG. 1, the valve unit 30 is in an open position with the seal member 30d spaced rightwardly from the seat 30e, and connects the inlet 30f to the chamber 24 and thereby the outlet 24a. In the position of FIG. 2, the valve unit 30 is in a closed position with the seal member 30d engaged with the seat 30e, and disconnects the inlet 30f from the chamber 24 and thereby the outlet 24a.

The spring 26 provides a reference force which corresponds to the pressure to which the fluid in the chamber 24 is to be regulated. If the compression of the spring 26 is X and the effective diameter D of the diaphragm 18 has a constant value as in the conventional valve described above, the regulated pressure $p=(4K/\pi D^2)X$, Where K is the "spring constant" which corresponds to the stiffness of the spring 26. Thus, without the improvement of the invention, the regulated pressure would increase linearly with the compression of the spring 26 and corresponding leftward movement of the diaphragm 18 and valve element 30b, and vice-versa.

Figure 3:
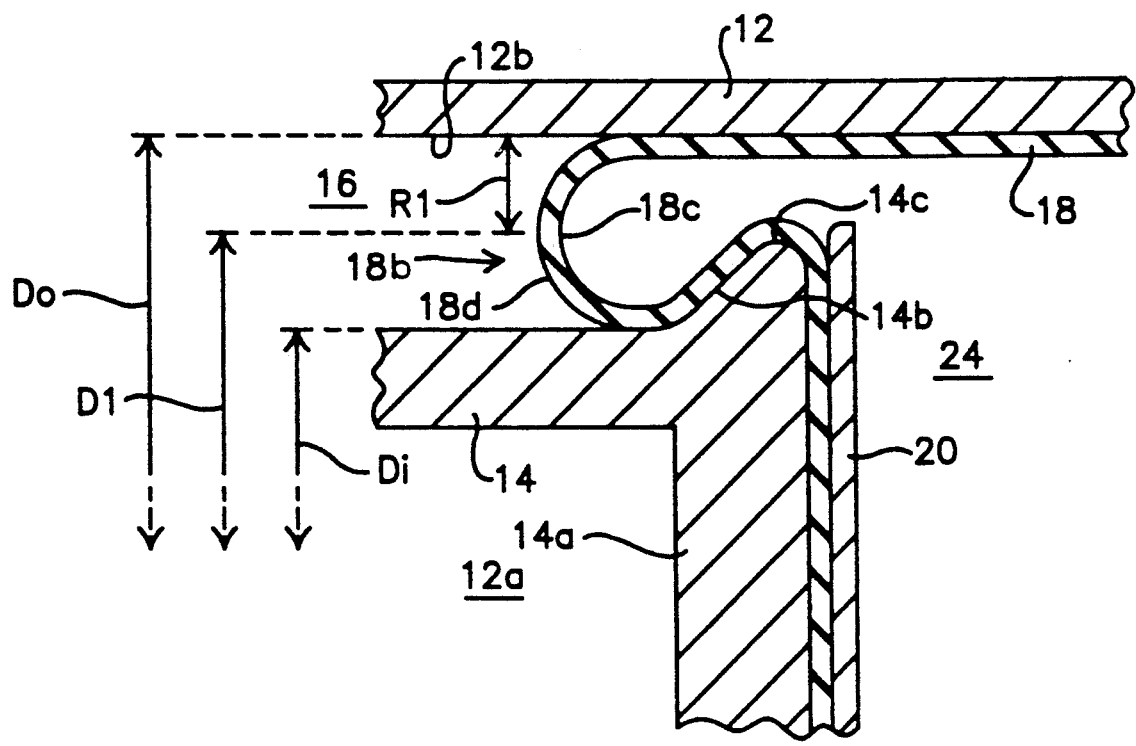
FIGS. 3, 4 and 5 are fragmentary sectional views illustrating a rolling diaphragm and a piston of the valve in minimum, maximum and intermediate diameter positions respectively.
Figure 4:
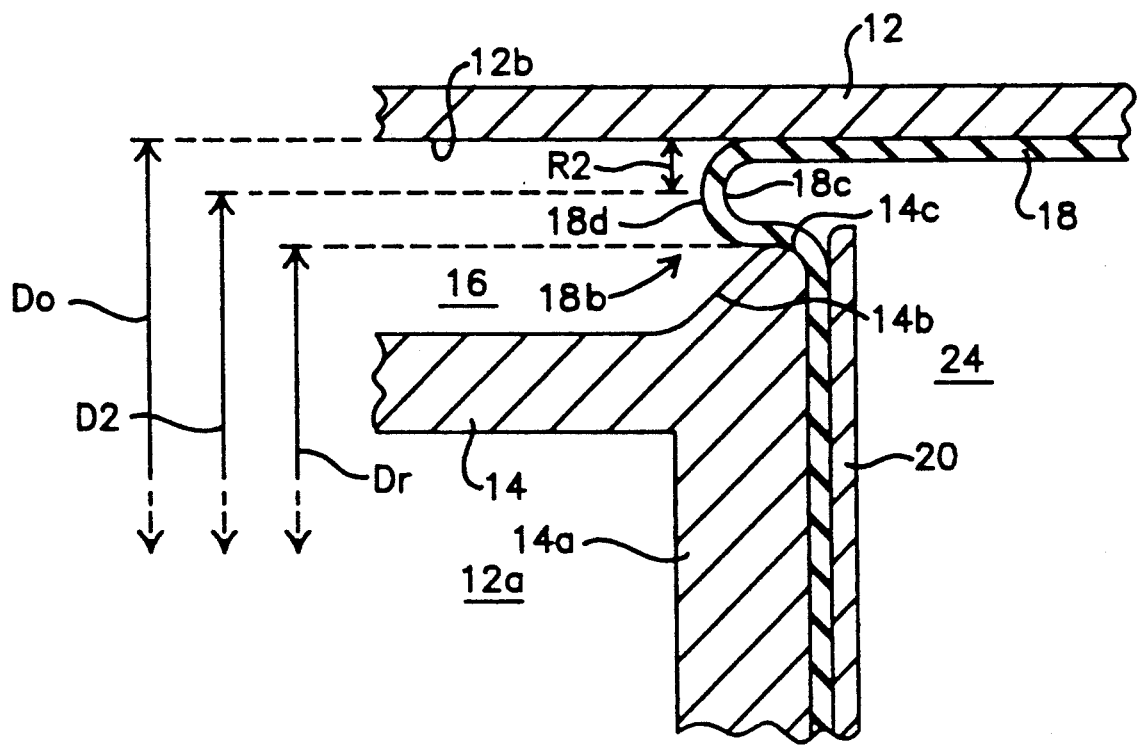
Figure 5:
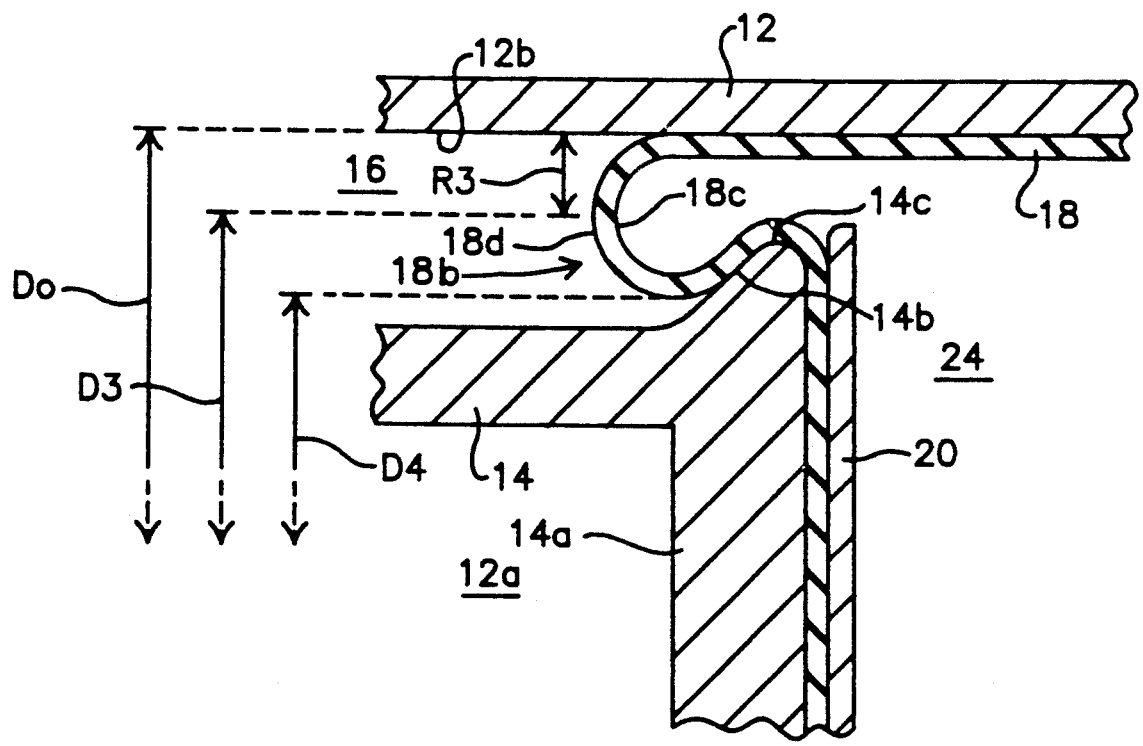

With reference further being made to FIGS. 3 to 5, this undesirable effect is eliminated in accordance with the present invention and the pressure in the chamber 24 is regulated to a constant desired value at all operative positions of the diaphragm 18 and valve element 30b. The rolling portion 18b of the diaphragm 18 has a first face 18c which is exposed to the fluid pressure in the chamber 24 and a second face 18d which engages with the peripheral surface of the piston 14.

The right end portion of the piston 14 which terminates at the right face of the wall 14a is shaped as a ramp 14b, having a diameter which increases toward the chamber 24. The main portion of the piston 14 which terminates at the left end of the ramp 14b has a diameter Di. As illustrated in FIG. 4, the maximum diameter of the ramp 14b at a point 14c near its right end has a value Dr. The right end portion of the ramp 14b is curved or radiused to eliminate a sharp edge which could cut the diaphragm 18.

The inner diameter of the bore 12a of the cylinder 12 is Do. The height of the annular space 16 is therefore (Do−Di)/2. In the open position of the valve 10 as illustrated in FIGS. 1 and 3, the lower surface of the rolling portion 18b of the diaphragm 18 engages with the main portion of the piston 14 leftward of the ramp 14b.

The fluid pressure in the chamber 24 acting on the face 18c of the rolling portion 18b of the diaphragm 18 causes the portion 18b to be expanded into a shape which, for practical purposes, approximates a circle having an outer radius R1=(Do−Di)/4. The effective diameter D1 of the diaphragm 18 upon which the fluid pressure in the chamber 24 acts is the diameter of the center of the annulus defined by the rolling portion 18b, or D1=(Di+2R1)=(Do+Di)/2.

As illustrated in FIGS. 2 and 4, the valve 10 is in a closed position with the lower surface of the rolling portion 18b of the diaphragm 18 engaging with the ramp 14b at the maximum diameter point 14c. The outer radius of the rolling portion 18b is therefore (Do−Dr)/4, and the effective pressure receiving diameter of the diaphragm 18 is D2=(Dr+2R2)=(Do+Dr)/2.

FIG. 5 illustrates an intermediate position of the valve 10 in which the lower surface of the rolling portion 18b engages with an intermediate point on the ramp 14b. The outer radius R3 of the rolling portion 18b is (Do−D4)/4, and the effective pressure receiving diameter of the diaphragm 18 is D3=(D4+2R3)=(Do+D4)/2.

The diameter D2 in the closed position of the valve 10 is larger than the diameter D1 in the open position thereof, and the spring 26 exerts a greater force on the diaphragm 18 in the closed position than in the open position. However, since F=pA, where A=($\pi D^2/4$), and the effective diameter and thereby the area of the diaphragm 18 on which the pressure acts are larger in the closed position than in the open position of the valve 10, the regulated pressure P can be made the same in both the open and closed positions of the valve 10.

More specifically, as the diaphragm 18 is moved leftwardly and the force of the spring 26 exerted on the diaphragm 18 increases, the diameter of the diaphragm 18 increases by an amount which is predetermined to correspond to the increased spring force. The pressure in the chamber 24 acts on a larger diaphragm area, and therefore exerts a greater force on the diaphragm 18 in opposition to the spring force. By suitably configuring the cross-section of the ramp 14b, the regulated pressure can be maintained constant at all operative positions of the valve 10.

The optimal cross-section of the ramp 14b is paraboloid, and determined as follows.

$$F = KX = PA = P(\pi D^2/4)$$

Rearranging terms produces $$D^2 = (4K/\pi P)X$$

Since the pressure P which is to be regulated is constant, the cross-section of the ramp 14b can be defined by the equation $$D = CX^{\frac{1}{2}}, \text{ where } C = (4K/\pi P)^{\frac{1}{2}} \text{ and } \Delta L = 2\Delta X$$

Figure 6:
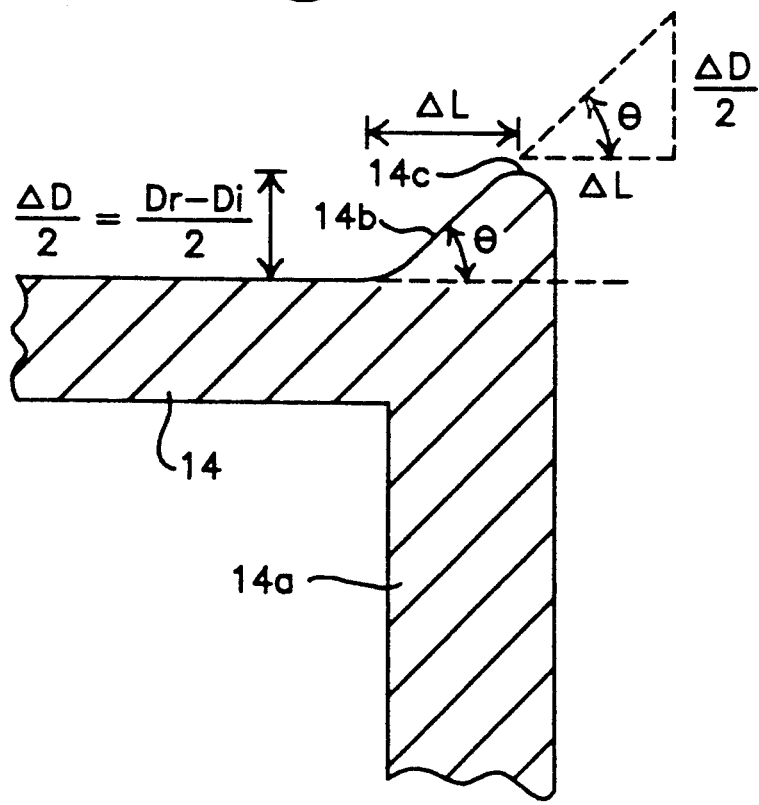
FIG. 6 is a fragmentary sectional view of a ramp portion of the piston.

In many practical applications, the cross-section of the ramp 14b can be approximated with sufficient accuracy by a straight line. As illustrated in FIG. 6, where $\Delta L$ is the longitudinal displacement of the diaphragm 18 between the maximum open and closed positions of the valve 10 and $\Delta D$ is the required difference in effective diameter D of the diaphragm 18 required to produce the same regulated pressure in the maximum open and closed positions, the slope $\theta$ of the ramp 18b is $\theta = \tan^{-1}(\Delta D/2\Delta L)$.

It will be noted that the entire length of the ramp 18b need not be used, and that the maximum open and closed positions of the valve 10 can correspond to two intermediate positions on the ramp 18b.

Figure 7:
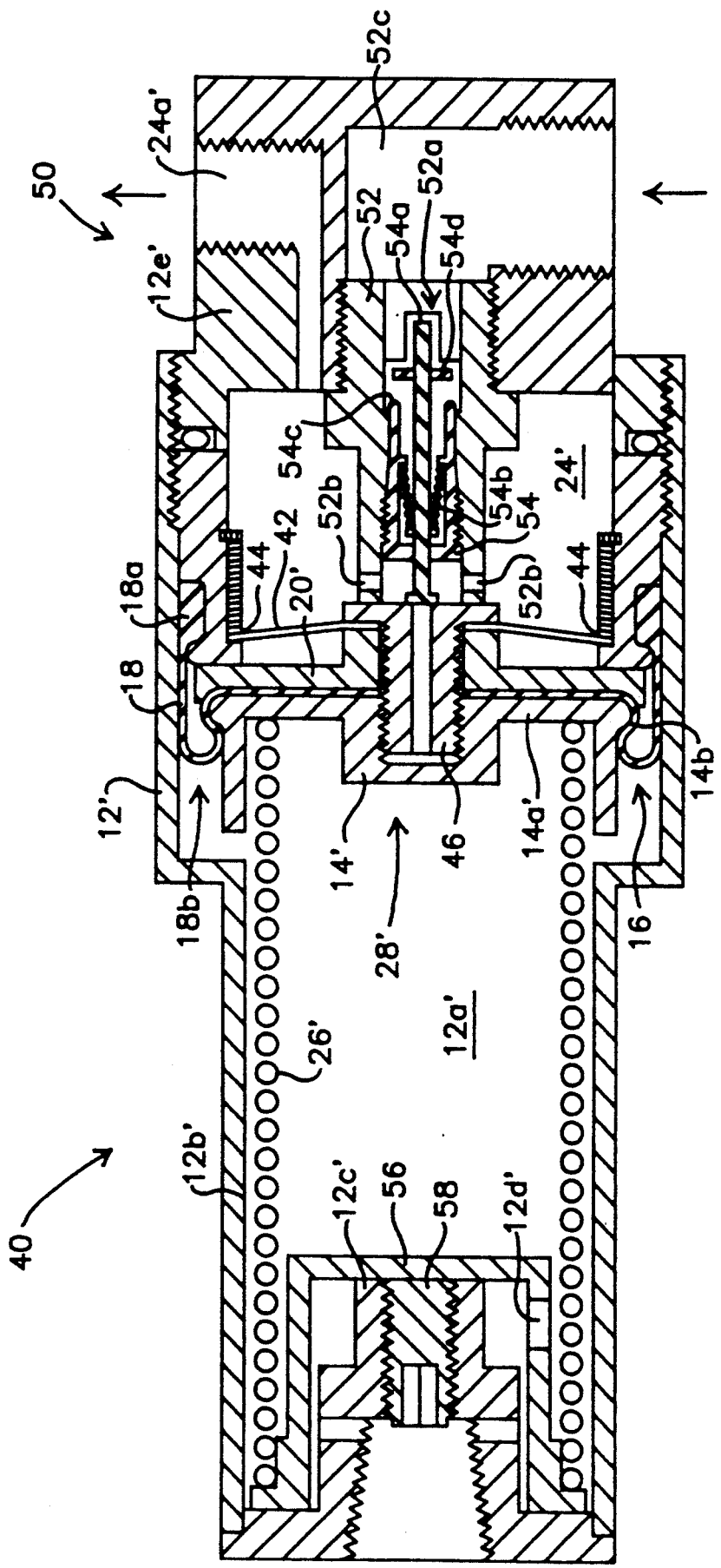
FIG. 7 is a longitudinal sectional view illustrating a second embodiment of a pressure regulating valve according to the present invention in an open position.
Figure 8:
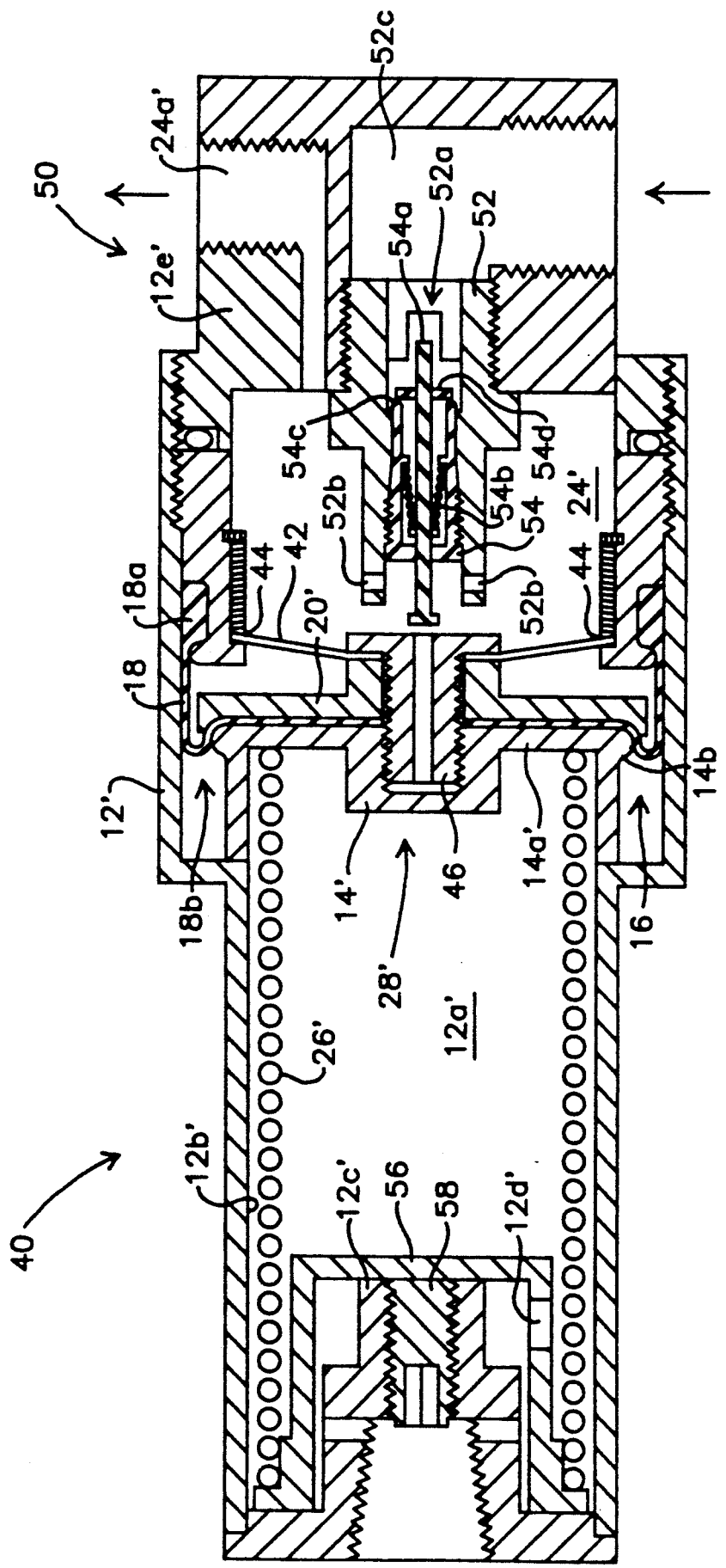
FIG. 8 is similar to FIG. 7, but illustrates the valve in a closed position.

FIGS. 7 and 8 illustrate another pressure regulating valve 40 embodying the present invention. Like elements are designated by the same reference numerals used in FIGS. 1 and 2, and corresponding but modified elements are designated by the same reference numerals primed. The valve 40 differs from the valve 10 in that it is bistable, having only two stable positions, open and closed, as illustrated in FIGS. 7 and 8 respectively.

The bistable operation is provided by a wafer spring 42 in the shape of a conical disk having its periphery loosely retained in a groove 44 in an inner peripheral surface 12b' of a cylinder 12'. The spring 42 is formed with a central hole (not designated) which enables the spring 42 to be fixed to a piston 14' and cap 20' by means of a screw 46.

The spring 42 has two stable positions as illustrated in FIGS. 7 and 8 in which it snapped or bowed to the right and left respectively. The spring 42 can be snapped or bowed from one position to the other by applying a force greater than a value F1 to the radially inner portion of the spring 42 while preventing the outer periphery of the spring 42 from moving.

The valve 40 includes a valve unit 50 including a threaded sleeve 52 which is screwed into the right portion of a cylinder 12' as illustrated and formed with a bore 52a. The left end of the bore 52a opens into a pressure chamber 24'. Radial holes 52b also communicate the left end portion of the bore 52a with the chamber 24'. The right end of the bore 52a communicates with an inlet 52c.

A valve core 54 is threaded into the bore 52a, and includes a valve shaft or stem 54a which is urged leftwardly by a compression spring 54b. The valve core 54 is also formed with a valve seat 54c at its right end. A seal member 54d which is sealingly engagable with the seat 54c is fixed to the right end portion of the stem 54a. The valve core 54 per se is a conventional element of the type provided in standard automotive tires to enable inflation and deflation. Valve cores 54 suitable for practicing the present invention are available, for example, from Schrader Automotive, Inc. of Charlotte, N.C.

Further illustrated is a spring seat 56 which is slidably retained in a bore 12a' of the cylinder 12' and engages with the left end of a spring 26'. A setscrew 58 is threaded through a hole (not designated) in a left end wall 12c' of the cylinder 12' and engages with the spring seat 56 to enable the seat 56 to be moved longitudinally and the preload of the spring 26' thereby adjusted to a desired value.

The valve core 54 controls communication between the inlet 52c, and the pressure chamber 24' and outlet 24a'. The open position of the valve 40 is illustrated in FIG. 7. This condition occurs when the pressure in the chamber 24' drops below a relatively low predetermined value in which the force of the spring 26' is sufficient to overcome the pressure in the chamber 24' and the bistable force F1 of the spring 42.

The diaphragm 18 and piston 14' move rightwardly to the bistable position of the spring 42 as illustrated in FIG. 7 in which the right end of the screw 46 engages with the left end of the valve stem 54a and moves the stem 54a rightwardly. The seal member 54d disengages from the valve seat 54c, thus opening the valve core 54 and establishing communication between the inlet 52c and chamber 24'.

The valve 40 will change from the open position of FIG. 7 to the closed position of FIG. 8 when the pressure in the chamber 24' rises to a relatively high predetermined value which is sufficient to overcome the forces of the springs 26' and 42. The diaphragm 18 and piston 14' move leftwardly to the bistable position of the spring 42 as illustrated in FIG. 8 in which the right end of the screw 46 disengages from the left end of the valve stem 54a, and the spring 54b moves the stem 54a leftwardly. The seal member 54d engages with the valve seat 54c, thereby closing the valve core 54 and blocking communication between the inlet 52c and chamber 24'.

The spring 42 provides a bistable or hysteresis function in which the valve 40 closes at a first predetermined pressure and opens at a second predetermined pressure which is lower than the first predetermined pressure. The difference between the opening and closing pressures is determined by the bistable force F1 of the spring 42. Although not specifically illustrated, a magnetic or other mechanism may alternatively be employed to provide the bistable function within the scope of the invention. It is also possible to provide an electrical switch (not shown) for sensing the open or closed status of the valve 40.

While several illustrative embodiments of the invention have been shown and described, numerous variations and alternate embodiments will occur to those skilled in the art, without departing from the spirit and scope of the invention.

For example, the ramp 14b of the piston 14 can be shaped to provide some desired relationship between pressure and displacement other than maintaining a constant pressure. By appropriately shaping the ramp 14b, the pressure can be made to increase or decrease linearly or non-linearly as the spring 26 is compressed.

Accordingly, it is intended that the present invention not be limited solely to the specifically described illustrative embodiments. Various modifications are contemplated and can be made without departing from the spirit and scope of the invention as defined by the appended claims.

I claim:

1. A fluid pressure control mechanism, comprising:
   a rolling diaphragm having a first face exposed to a fluid whose pressure is to be controlled;
   a spring for urging the diaphragm against said pressure; and
   compensation means for varying the effective diameter of the diaphragm as a predetermined function of the longitudinal position of the diaphragm such that the force exerted on the diaphragm by said pressure is maintained in a predetermined relationship to the force exerted on the diaphragm by the spring, in which said compensation means varies the effective diameter of the diaphragm as a predetermined function of the longitudinal position of the diaphragm such that the force exerted on the diaphragm by said pressure is maintained substantially equal to the force exerted on the diaphragm by the spring, and
   wherein said mechanism further comprises:
   valve means actuated by the diaphragm for controlling said pressure, and the valve means controls communication between said first face of the diaphragm and a high pressure source of said fluid; and
   bistable means for urging the diaphragm toward a first longitudinal position in which the valve means is open when said pressure drops below a first predetermined value; and toward a second longitudinal position in which the valve means is closed when said pressure rises above a second predetermined value which is higher than said first predetermined value.

2. A mechanism as in claim 1, in which the bistable means comprises a flexible, conical disk which is substantially fixedly retained at its outer periphery and has a radially inner portion connected to the diaphragm.

3. A fluid pressure regulating valve, comprising:
   a pressure chamber filled with a fluid whose pressure is to be regulated to a first predetermined value;
   valve means disposed between the chamber and a source of said fluid at a pressure higher than said first predetermined value;
   a rolling diaphragm which has a first face exposed to said fluid in the chamber, and which actuates the valve means to connect the chamber to the source when said pressure in the chamber drops below said first predetermined value and to disconnect the chamber from the source when said pressure in the chamber rises to substantially said first predetermined value;
   a spring for urging the diaphragm against said pressure in the chamber; and
   compensation means for varying the effective diameter of the diaphragm as a predetermined function of the longitudinal position of the diaphragm such that the force exerted on the diaphragm by said pressure in the chamber is maintained in a predetermined relationship to the force exerted on the diaphragm by the spring in which said compensation means varies the effective diameter of the diaphragm as a predetermined function of the longitudinal position of the diaphragm such that the force exerted on the diaphragm by said pressure is maintained substantially equal to the force exerted on the diaphragm by the spring,
   further comprising bistable mans for urging the diaphragm toward a first longitudinal position in which the valve means is open when said pressure drops below a second predetermined value which is lower than said first predetermined value; and toward a second longitudinal position in which the valve means is closed when said pressure rises to substantially said first predetermined value.

4. A mechanism as in claim 3, in which the bistable means comprises a flexible, conical disk which is substantially fixedly retained at its outer periphery and has a radially inner portion connected to the diaphragm.

* * * * *